(12) United States Patent
Van Wel

(10) Patent No.: US 9,239,702 B2
(45) Date of Patent: Jan. 19, 2016

(54) DATA PROCESSING APPARATUS

(75) Inventor: Antonius Adrianus Maria Van Wel, Den Bosch (NL)

(73) Assignee: Intel Corporation, Santa Clara, CA (US)

( * ) Notice: Subject to any disclaimer, the term of this patent is extended or adjusted under 35 U.S.C. 154(b) by 2749 days.

(21) Appl. No.: 11/570,167

(22) PCT Filed: Jun. 8, 2005

(86) PCT No.: PCT/IB2005/051883
§ 371 (c)(1),
(2), (4) Date: Apr. 21, 2008

(87) PCT Pub. No.: WO2005/124534
PCT Pub. Date: Dec. 29, 2005

(65) Prior Publication Data
US 2008/0253442 A1 Oct. 16, 2008

(30) Foreign Application Priority Data
Jun. 16, 2004 (EP) .................... 04102749

(51) Int. Cl.
*G06F 5/01* (2006.01)
*G06F 5/00* (2006.01)
(Continued)

(52) U.S. Cl.
CPC .. *G06F 5/01* (2013.01); *G06F 5/00* (2013.01); *G06F 7/76* (2013.01); *G06F 7/762* (2013.01);
(Continued)

(58) Field of Classification Search
None
See application file for complete search history.

(56) References Cited

U.S. PATENT DOCUMENTS 5,479,166 A 12/1995 Read et al.
6,317,824 B1 * 11/2001 Thakkar et al. ............... 712/222
(Continued)

FOREIGN PATENT DOCUMENTS

EP 992882 A2 * 4/2000 ............... G06F 7/00
FR 2842670 A1 * 1/2004 ............. H03M 7/30
(Continued)

OTHER PUBLICATIONS

Written opinion of the International Search Authority for PCT/IB2005/051883 (Dec. 20, 2006).*
(Continued)

*Primary Examiner* — Dave Czekaj
*Assistant Examiner* — David N Werner
(74) *Attorney, Agent, or Firm* — Leydig, Voit & Mayer, Ltd.

(57) ABSTRACT

A programmable data processing apparatus having a bit-plane extraction operation is described, for extracting data from a value of, for example, 32 bits containing 4 bytes, 1*a* to 1*d*. Each byte 1*a* to 1*d* comprises 8 bits, ($a_0$-$a_7$, $b_0$-$b_7$, $c_0$-$c_7$ and $d_0$-$d_7$, respectively). The bit-plane extraction operation retrieves one bit from each of these bytes, for example the second bit ($a_1$, $b_1$, $c_1$, $d_1$), which is specified by an argument. The operation involves concatenating these bits ($a_1$, $b_1$, $c_1$, $d_1$) and returning a result value 5. Depending on the particular data processing application, the result value may be bit-reversed to provide a result value 7 (for example, if a bit-reversal is required to deal with endianness, or other reasons). The bit-plane extraction operation can be used as a pre-processing operation in data processing operations such as "sum-of-absolute-differences" in the processing of video data.

7 Claims, 4 Drawing Sheets

(51) Int. Cl.
*G06F 7/76* (2006.01)
*G06F 9/30* (2006.01)
*H04N 19/184* (2014.01)
*H04N 19/169* (2014.01)
*H04N 19/42* (2014.01)
*H04N 19/436* (2014.01)
*H04B 1/66* (2006.01)
*G06F 5/16* (2006.01)

(52) U.S. Cl.
CPC ........ *G06F 9/30018* (2013.01); *G06F 9/30029* (2013.01); *G06F 9/30036* (2013.01); *G06F 5/015* (2013.01); *G06F 5/16* (2013.01); *G06F 7/768* (2013.01); *H04B 1/66* (2013.01); *H04B 1/667* (2013.01); *H04N 19/184* (2014.11); *H04N 19/1883* (2014.11); *H04N 19/42* (2014.11); *H04N 19/436* (2014.11)

(56) References Cited

U.S. PATENT DOCUMENTS

| | | | |
|---|---|---|---|
| 2003/0035476 A1* | 2/2003 | Ohyama et al. | H04N 19/13 375/240.1 |
| 2003/0156637 A1* | 8/2003 | Van Der Schaar | H04N 19/176 375/240.01 |
| 2004/0247156 A1* | 12/2004 | Otsuki | G06T 1/0028 382/100 |
| 2005/0271285 A1* | 12/2005 | Kimura et al. | H04N 19/63 382/233 |
| 2007/0110165 A1* | 5/2007 | Park et al. | H04N 19/129 375/240.24 |
| 2007/0160299 A1* | 7/2007 | Kajiwara et al. | H04N 19/46 382/240 |
| 2007/0165713 A1* | 7/2007 | Van Der Vleuten et al. | H04N 19/60 375/240 |

FOREIGN PATENT DOCUMENTS

| | | |
|---|---|---|
| JP | 57-207942 | 12/1982 |
| JP | 60-159935 | 8/1985 |
| JP | 63-052236 | 3/1988 |
| JP | 63-298623 | 12/1988 |
| JP | 01-099123 | 4/1989 |
| JP | 01-132135 | 5/1989 |
| JP | 05-334042 | 12/1993 |

OTHER PUBLICATIONS

Danny Cohen, "On Holy Wars and a Plea for Peace", _Computer_, Oct. 1981, at 48-54.*

Itoh International Patent Office, Official Office Action in corresponding Japanese Patent Application No. 2007-516101, mailing date Aug. 4, 2009 (8 pages).

* cited by examiner

DATA PROCESSING APPARATUS

FIELD OF THE INVENTION

The invention relates to a programmable data processing apparatus, and in particular to a programmable data processing apparatus having a bit-plane extraction operation for processing data such as video data.

BACKGROUND

In the video domain pixels are typically represented by one or several bytes of data. For example, in the default format used for MPEG video encoding, a pixel is stored by saving its luminance component as a byte. The chrominance part of the pixel is stored as two bytes, but these values are shared for several pixels at the same time. If the luminance part is considered, for example, the byte consists of 8 individual bits, and is referred to as a "bit-plane".

A dominant part of MPEG video encoding consists of motion estimation, which can be computed very efficiently when carried out on a bit-plane basis. The "sum-of-absolute-differences" operation, when executed on a bit-plane basis, involves an exclusive-or operation only, followed by counting the bits of the result value, the latter often being supported as a single instruction in a DSP processor. During a pre-processing step, the bit-plane has to be extracted from the video stream. Such a pre-processing step may involve, for example, extracting a particular bit from each byte in a 32 bit value containing four packed bytes. To perform the bit-plane extraction operation in software involves the following operations (shown in pseudo C) to obtain a 4-bit result value, r.

The result, $r=bpext(x,y)$ where, x=32 bit value containing four packed bytes y=integer number between 0 and 7 referring to the bit to be extracted A bit-plane extraction operation may comprise the following operations:

```
unsigned bpext_big (unsigned x, unsigned y)
{
    unsigned t0 = x>>y;
    return      (t0 & 0x00000001) |
                ((t0 & 0x00000100) >> 7) |
                ((t0 & 0x00010000) >> 14) |
                ((t0 & 0x01000000) >> 21);
}
```

The bit-plane extraction operation shown above will now be described in greater detail with reference to FIG. 1. First, in step 101 the value x is shifted over y positions (ie "y" being the numerical number representing the bit to be extracted), such that the bits to be extracted are all at the same location. Then, in step 103, one bit is extracted using an AND operation (for example t0 & 0x00000001 for the first bit). This is repeated, steps 105 to 107, to extract the relevant bit from each of the other bytes until the $n^{th}$ bit is extracted ("n" being four in the example). In step 109 the extracted bits are then shifted to the target bit locations (corresponding to the final positions of the bits in the end result), and ORed together, step 111.

The pixel data may be arranged in "big endian" format or "little endian" format. In the big endian format the bytes are arranged with the most significant byte first, while in the little endian format the bytes are arranged with the least significant byte first. Therefore, depending on the endianness of the pixel data, or indeed for other reasons, it may be desirable to reverse the resulting bits.

An implementation example of how to reverse the bits is shown below:

```
unsigned bpext_reverse (unsigned x, unsigned y)
{
    unsigned r = bpext (x, y);
    return   ((r&1)<<3) | ((r&2)<<1) | ((r&4)>>1) | ((r&8)>>3);
}
```

The instruction code shown above selects individual bits and shifts them to their reversed locations, so that bit 0 becomes bit 3 ((r&1)<<3), bit 1 becomes bit 2 ((r&2)<<1), etc., and these bits are again ORed together.

It is noted that the example above shows how to select just a single bit from packed data. However, more than one bit can also be extracted, for example, selecting two bits per byte or data element, and concatenating these bits into an eight bit result value.

It will be appreciated that, to perform the bit-plane extraction operation described above on a programmable data processor, the bit-plane extraction operation involves the execution of several (non-dedicated) operations. This has disadvantages both in terms of performance and power consumption.

The aim of the present invention is therefore to provide a programmable data processing apparatus having a bit-plane extraction operation that does not have the disadvantages mentioned above.

SUMMARY OF THE INVENTION

According to a first aspect of the present invention, there is provided a programmable data processing apparatus for processing data, the data processing including the task of performing a bit-plane extraction operation on packed data bits, the packed data bits comprising a plurality of data elements, each data element having a plurality of data bits, the apparatus comprising:

extracting means for selectively extracting a data bit from each of the data elements, and concatenating means for concatenating the extracted data bits to provide a result value, wherein the result value is further processed by the programmable data processing apparatus.

According to another aspect of the invention, there is provided a method of performing a bit-plane extraction operation on packed data bits in a programmable data processor, the packed data bits comprising a plurality of data elements, each data element having a plurality of data bits, the method comprising the steps of providing dedicated hardware means for selectively extracting a data bit from each data element, and concatenating the extracted data bits to provide a result value for further processing by the programmable data processor.

BRIEF DESCRIPTION OF THE DRAWINGS

For a better understanding of the invention, and to show more clearly how the invention may be carried into effect, reference will now be made, by way of example only, to the following drawings in which.

DETAILED DESCRIPTION OF A PREFERRED EMBODIMENT OF THE PRESENT INVENTION

According to the present invention, dedicated hardware is provided for performing the bit-plane extraction operation.

Figure 1:
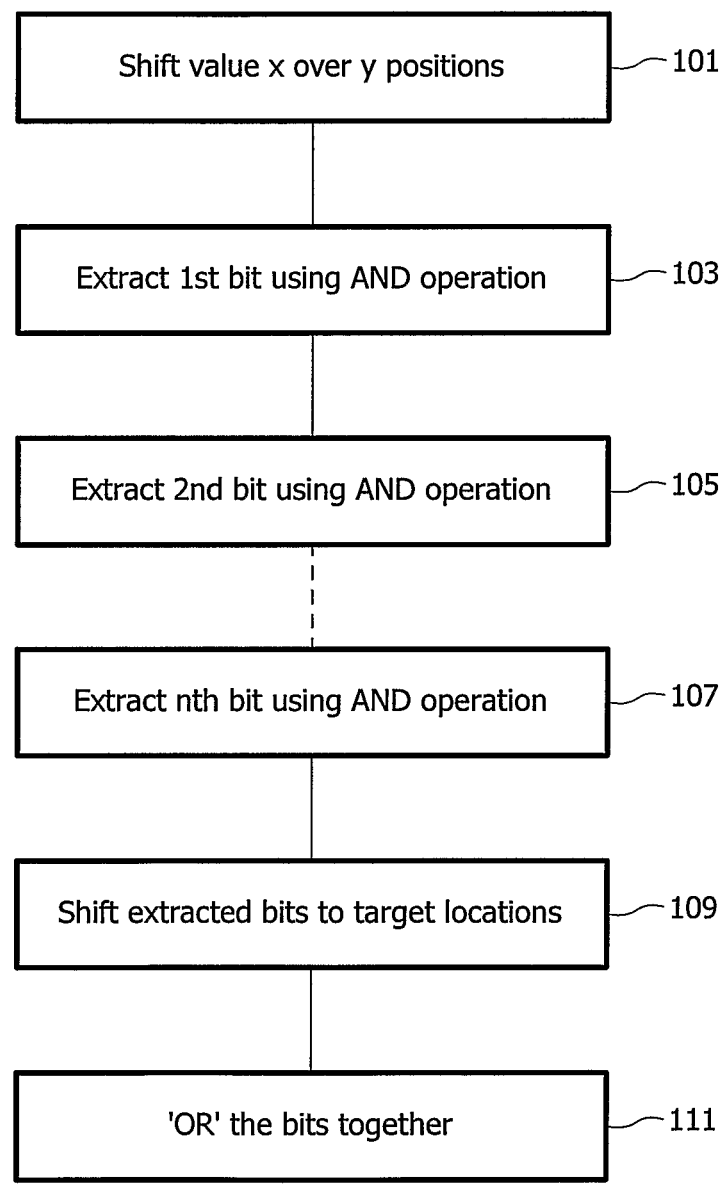
FIG. 1 shows a bit-plane extraction operation according to the prior art.
Figure 2A:
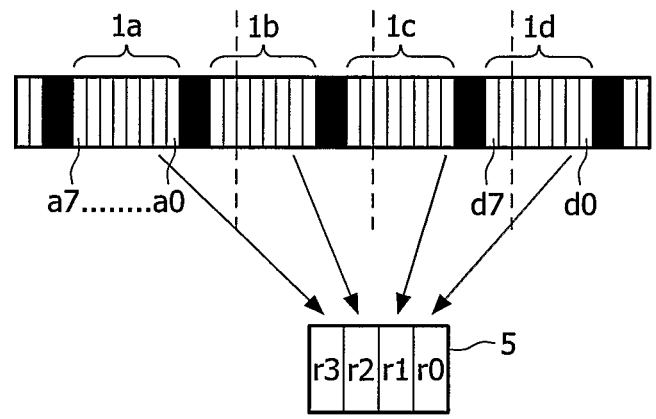
FIGS. 2a and 2b describe a bit-plane extraction operation according to the present invention, with or without bit-reversing the result, respectively.

Referring to FIG. 2a, consider a value of 32 packed data bits, for example containing 4 bytes or data elements, $1a$ to $1d$. Each byte $1a$ to $1d$ comprises 8 bits, ($a_1$-$a_7$, $b_1$-$b_7$, $c_0$-$c_7$ and $d_0$-$d_7$, respectively). The bit-plane extraction operation selectively retrieves one bit from each of these bytes, for example the second bit ($a_1$, $b_1$, $c_1$, $d_1$), which is specified by an argument. The operation involves concatenating these bits ($a_1$, $b_1$, $c_1$, $d_1$) and returning a 4-bit result value 5 (having a first bit referred to as $r_0$, a second bit $r_1$, etc.). If the data being processed does not need to be bit-reversed, the result value 5 is such that $r_3=a_1$, $r_2=b_1$, $r_1=c_1$, $r_0=d_1$.

Figure 2B:
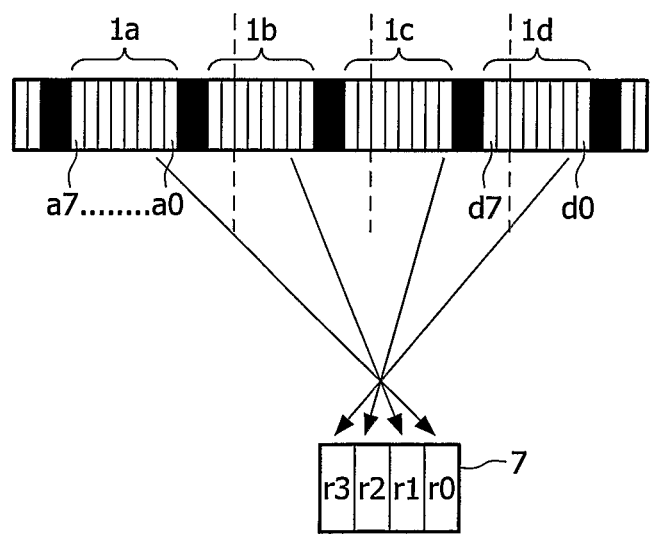

FIG. 2b shows a similar bit-plane extraction apparatus, if the result does need to be bit-reversed, whereby the extracted data bits are reversed in the result value 7, such that $r_3=d_1$, $r_2=c_1$, $r_1=b_1$, $r_0=a_1$. In other words, in the embodiment shown in FIG. 2a, the bit-plane extraction operation provides a result value 5 with no bit-reversal, while in FIG. 2b the bit-plane extraction operation provides a result value 7 with bit-reversal.

As shown above, the hardware can be configured to provide a result value that is not bit-reversed (ie as shown in FIG. 2a), or a result value that is bit-reversed (as shown in FIG. 2b). As mentioned earlier, the bit-reversal of the result can be carried out for a number of reasons, one of which may be to deal with endianness.

Alternatively, the hardware can be configured to selectively provide the result in the normal or bit-reversed formats. For example, bit-reversal can be set as a parameter, so that the apparatus can return a result 5 or a bit-reversed result 7, as described later in the application. The parameter may be controlled by software, or configured beforehand in hardware, depending on whether or not bit-reversal of the result is required for a particular application.

Figure 3:
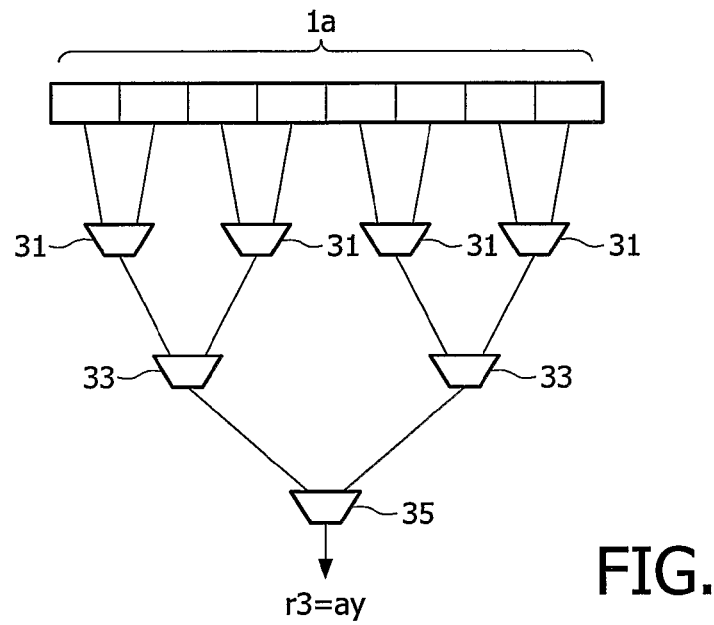
FIG. 3 shows an example of how the bit-plane extraction operation of FIG. 1 can be implemented in hardware using multiplexers.

FIG. 3 shows in greater detail how the bit-plane extraction operation may be implemented in hardware at low cost. For example, the operation can be implemented entirely by multiplexers, only 3 levels deep.

In FIG. 3, for ease of reference there is shown a multiplexer arrangement for extracting a bit from just one of the bytes shown in FIGS. 2a and 2b, (byte $1a$). Similar arrangements are provided for each of the other bytes. A first level of multiplexers 31 reduce the eight bits to four (ie n to n/2), a second level of multiplexers 33 reduce these four bits to two, while a multiplexer 35 in a third level reduces these two bits to one. In this manner, any bit $a_y$ can be extracted from the bits $a_7$ to $a_0$. In a similar manner, multiplexers can be used to extract a bit $b_y$ from the byte $1b$, a bit $c_y$ from the byte $1c$, and a bit $d_y$ from the byte $1d$.

Figure 4:
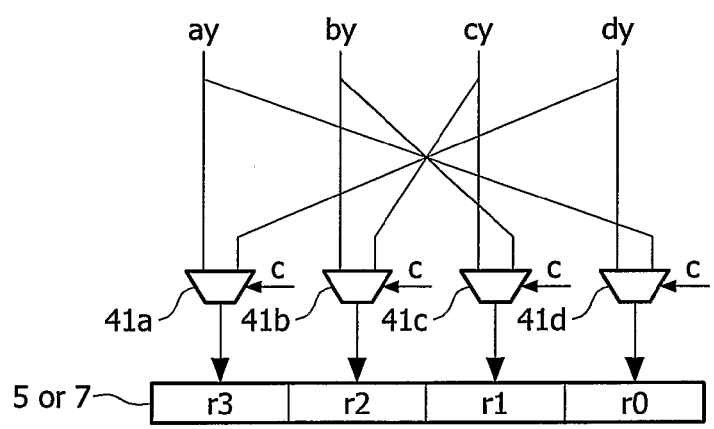
FIG. 4 shows a further aspect of the invention for bit-reversing the result.

FIG. 4 shows how bit-reversal of the result may be dealt with, by providing hardware to cope with both options. In FIG. 4, the extracted bits $a_y$, $b_y$, $c_y$, $d_y$ are passed to a set of multiplexers $41a$ to $41d$. The result value can therefore be controlled by the control signal "c", depending on whether or not bit-reversal is required.

Figure 5:
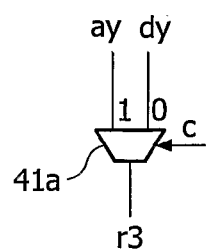
FIG. 5 shows further details of a multiplexer in FIG. 4.

One of the multiplexers, $41a$, is shown in greater detail in FIG. 5. When the control signal "c" is set high, the extracted bits $a_y$, $b_y$, $c_y$, $d_y$ form the result value 5. In other words: $r_3=a_y$; $r_2=b_y$; $r_1=c_y$; $r_0=d_y$. However, when the control signal "c" is low, the order of the extracted bits $a_y$, $b_y$, $c_y$, $d_y$ is reversed, such that $r_3=d_y$, $r_2=c_y$, $r_1=b_y$, and $r_0=a_y$, thereby forming a result value 7. In this manner, the additional hardware and parameter "c" can be used to provide bit-reversal when desired, for example to correct for endianness.

As described above, the parameter "c" can either be controlled by software (thus allowing the bit-reversal to be controlled dynamically), or set in hardware depending on the particular data processing application.

It will be appreciated that the invention described above provides a bit-plane extraction operation and apparatus that is more efficient than the prior art. In addition to improving performance, the bit-plane extraction method and apparatus also consumes less power than the operations performed in the prior art.

In practice, several results are combined into a single 32 bit value. For example, if one result corresponds to 4 bits, eight results can be combined into 32 bits. The sum-of-absolute-differences between two such values can then be computed by XORing the two 32 bit values, and counting the "1" bits of the result. According to the prior art, combining results would involve shifting a previous result, and ORing the current result into this value.

Figure 6:
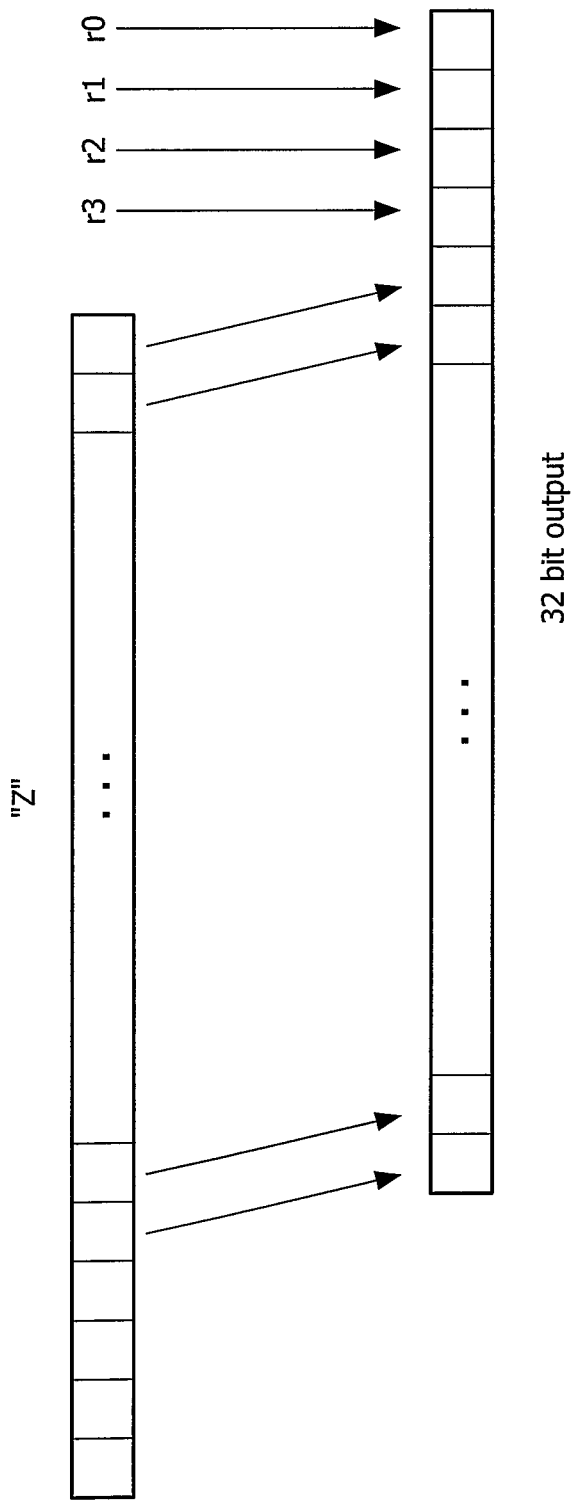
FIG. 6 shows a further aspect of the invention.

Using software, this involves the following operations:

```
unsigned bpext_reverse_shift (unsigned x, unsigned y, unsigned z)
{
    r + bpext_reverse (x, y);
    return (z<<4) | r;
}
``` where x: 32 bit value containing four packed bytes y: integer number between 0 and 7 referring to the bit to be extracted z: 32 bit value containing previous result However, according to another aspect of the invention, FIG. 6 shows an arrangement that enables this operation to be performed in hardware using one operation, rather than using the software described above.

The invention described above provides a programmable data processing apparatus having a bit-plane extraction means that can be used in a pre-processing step of a sum-of-absolute-differences operation. It is noted, however, that the invention is not limited to this use, and it will be appreciated that the bit-plane extraction operation can be used for other data processing operations where one or more bits need to be extracted from a plurality of bytes. Furthermore, the data bits do not necessarily need to be extracted from different bytes, for example where image data is represented by 12 bits per component.

Although the invention has been described in relation to extracting 4 bits, it is noted that, for processors with a wider data-path, for instance 64 bits, the instruction may be extended to retrieve 8 bits at once.

Also, although the preferred embodiment shows the use of multiplexers, it will be appreciated that other logic circuits providing the same function can also be used.

It should also be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a claim enumerating several means, several of these means may be embodied by one and the same item of hardware. The mere fact that certain measures are recited in mutually different dependent claims does not indicate that a combination of these measures cannot be used to advantage.

The invention claimed is:

1. A programmable data processing apparatus for processing data, the data processing including the task of performing a bit-plane extraction operation on packed data bits, the packed data bits comprising a plurality of data elements, each data element having a plurality of data bits, the apparatus comprising:

extracting means for selectively extracting a data bit from each of the data elements, the extracting means comprising a plurality of multiplexers, the plurality of multiplexers being arranged to select a particular data bit from each data element and the multiplexers being configured in a plurality of levels, each level selectively reducing the number of bits in each data element from n to n/2, until a desired bit is selected, and concatenating means for concatenating the extracted data bits to provide a result value, wherein the result value is further processed by the programmable data processing apparatus.

2. The apparatus of claim 1, wherein the extracting means is adapted to select more than one data bit from each of the data elements.

3. The apparatus of claim 1, wherein each data element comprises a data byte, and wherein the apparatus is configured to extract a predetermined data bit or bits from each of the plurality of data bytes.

4. The apparatus of claim 1, further comprising bit-reversing means for reversing the order of the data bits in the result value prior to subsequent processing by the programmable data processing apparatus.

5. The apparatus of claim 4, wherein the bit-reversing means for reversing the bit order comprises a series of multiplexers, the multiplexers being arranged such that:

in a first mode of operation the concatenated data bits forming the result value pass through the multiplexers without changing the order of the result value; and in a second mode of operation the order of the concatenated data bits is reversed while passing through the multiplexers.

6. The apparatus of claim 5, wherein the mode of operation is controlled by a parameter, thereby enabling the bit-reversal means to be dynamically controlled depending on a particular data processing application.

7. The apparatus of claim 1, the apparatus further comprising means for combining the result value with a previous result value.

* * * * *